US007146472B2

(12) United States Patent
Gerbault

(10) Patent No.: US 7,146,472 B2
(45) Date of Patent: Dec. 5, 2006

(54) METHOD FOR MODIFICATION OF DATA ON A MEMORY CARD ON A TRANSACTION

(75) Inventor: Eric Gerbault, Vence (FR)

(73) Assignee: ASK S.A., Valbonne (FR)

( * ) Notice: Subject to any disclaimer, the term of this patent is extended or adjusted under 35 U.S.C. 154(b) by 335 days.

(21) Appl. No.: 10/483,585

(22) PCT Filed: Apr. 15, 2003

(86) PCT No.: PCT/FR03/01205

§ 371 (c)(1),
(2), (4) Date: Jan. 9, 2004

(87) PCT Pub. No.: WO03/088262

PCT Pub. Date: Oct. 23, 2003

(65) Prior Publication Data

US 2005/0071539 A1   Mar. 31, 2005

(30) Foreign Application Priority Data

Apr. 16, 2002  (FR) .................................. 02 04705

(51) Int. Cl.
   G06F 12/00  (2006.01)
(52) U.S. Cl. ...................... 711/156; 711/103; 711/104; 711/115
(58) Field of Classification Search ..................... None
   See application file for complete search history.

(56) References Cited

U.S. PATENT DOCUMENTS 5,987,563 A * 11/1999 Itoh et al. ................... 711/103
5,987,572 A * 11/1999 Weidner et al. ............. 711/155
6,347,355 B1 * 2/2002 Kondo et al. ............... 711/103

FOREIGN PATENT DOCUMENTS

| WO | WO96/25743 A1 | 8/1996 |
| WO | WO99/33059 A1 | 7/1999 |

OTHER PUBLICATIONS

Nijjima, H., "Design of a Solid-State File Using Flash EEPROM", *IBM Journal of Research and Development*, IBM Corporation, Armonk, US, vol. 39, No. 5, pp. 531-545 (1995).

* cited by examiner

*Primary Examiner*—Reginald G. Bragdon
*Assistant Examiner*—Shawn Gu
(74) *Attorney, Agent, or Firm*—James C. Lydon

(57) ABSTRACT

A method for modification of data in a card transaction system having a memory card and a reader for reading the card. The card has a first memory (RAM) and a second memory (EEPROM) with data locations occupied by data recordings. Each transaction involves the modification of at least one of the data locations or the addition of a new recording. The method reads the address of a free location from a previous control register located in a first fixed location in the EEPROM memory, writes the new modified recording or addition in the free location, repeat the steps for each new recording to be modified or added, and writes in a second fixed location in the EEPROM memory a new control register containing the addresses of free locations within the EEPROM memory to use in the next transaction.

9 Claims, 1 Drawing Sheet

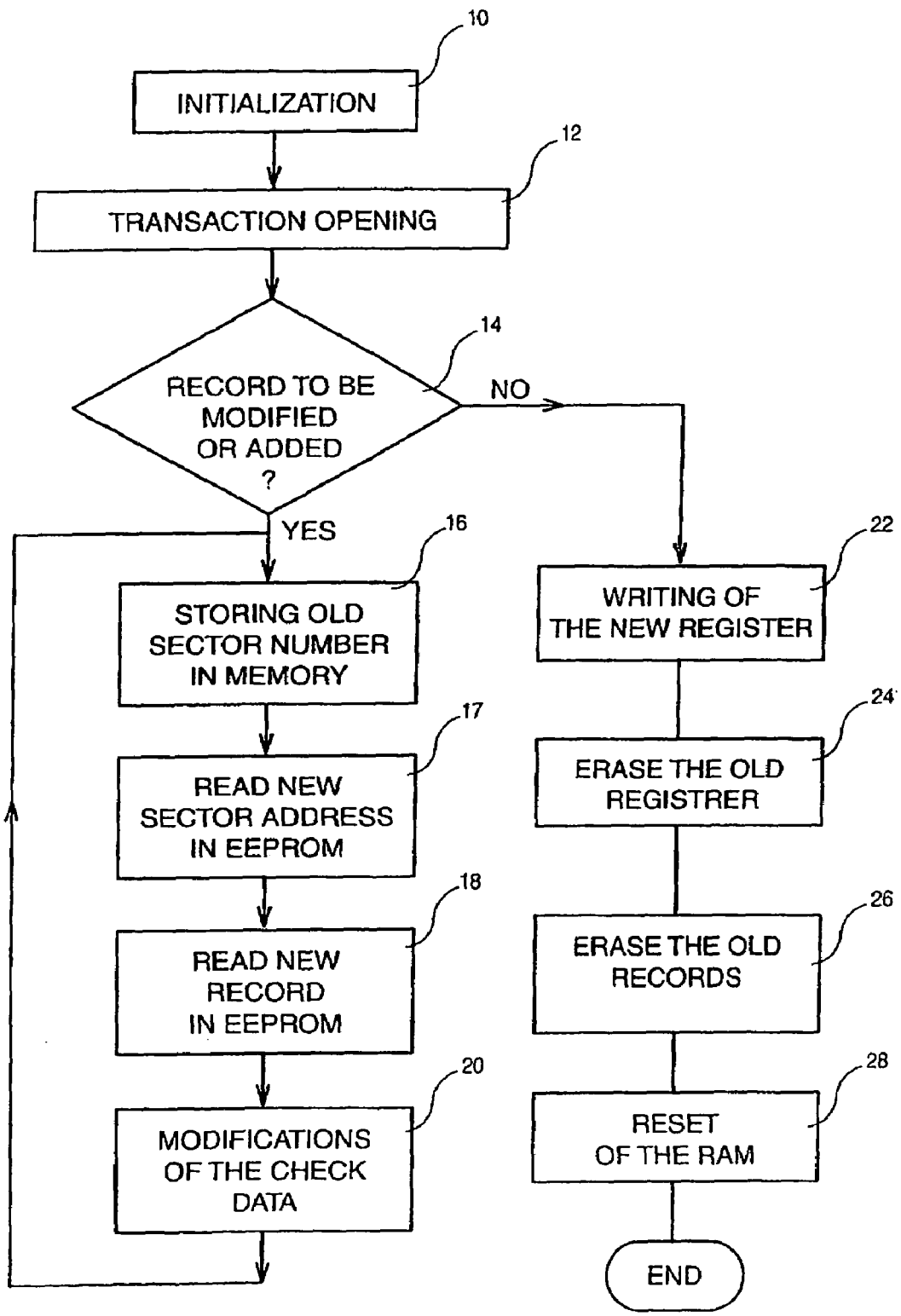
SINGLE FIGURE

METHOD FOR MODIFICATION OF DATA ON A MEMORY CARD ON A TRANSACTION

TECHNICAL FIELD

This invention concerns the systems in which part of the records of data memorized on the card is modified during a transaction made using a card reader and more specifically concerns a process for modifying memory card data during transaction with a reader.

BACKGROUND

Memory cards, still referred to as smart cards, are being used increasingly as a support for data associated with cardholders. Among these cards, contactless cards, which exchange information by remote electromagnetic coupling between an antenna lodged in the card and an associated reader, were developed as a means of access into controlled access zones, a means of personal identification or even electronic wallets.

The memory containing the data in a smart card is generally a nonvolatile, erasable and re-writable memory, preferably of EEPROM type. This type of memory is divided into a plurality of locations containing data records of a determined length, 32 bytes for example.

During a transaction, several records contained in the card's memory must generally be modified in order to be adapted to the new conditions resulting from the transaction. Unfortunately, the memory, particularly if it is of EEPROM type, requires a relatively long erase/write time (5 ms, for example), during which a power failure may result in the loss of the data contained in the record.

In addition, the various transaction operations, during which several data records are modified, operate in on/off mode. For transaction security reasons, all transactions must be repeated if a power outage occurs during the operation, at the risk of permanently losing sensitive data (for example, the credit balance of an electronic wallet) if it is not possible to repeat the transaction from the beginning.

In order to respond to the problem mentioned above, an attempt was made to memorize the data record in a buffer memory before modifying it. When all changes are completed, the old records are erased from the buffer memory.

Unfortunately, this method requires that 4 operations be performed for each record, namely saving into in the buffer zone, erasing the record to be modified, re-writing, and then erasing the old record in the buffer zone. When the transaction includes many operations, 8 operations for example, as may be the case, the transaction can take a long time and be incompatible with the time taken by the cardholder to present the card to the reader. In addition, the major drawback of this method is that the records in the data zone are always located in the same locations and that the buffer zone is located at a fixed place in the memory; this increases the "stress" on the memory and limits the number of transactions which may be carried out insofar as the number of operations is limited to a given value guaranteed by the silicon manufacturer.

SUMMARY OF THE INVENTION

Another problem that makes the above-mentioned problems more difficult relates to the designation of free sectors for positioning the modified records. The traditional method comprises scanning the memory in order to find a free sector. This operation takes time which adds to the time necessary for the already-mentioned operations for recording and erasing. However this time becomes very important and incompatible with the time of the transaction when there are several records to be modified and therefore several searches for free sectors.

This is why the object of the invention is to create a process for modifying memory card data during a transaction which allows the on/off mode synchronization of the modifications to be made during the transaction, over a short period of time compatible with the access time limited to the card during the transaction, while avoiding the use of a portion of the memory as a buffer memory for saving data and thus avoiding memory "stress" that results from always writing data in the same memory zones.

The invention thus concerns a process for modifying data in a card-based transaction system featuring a memory card and a reader capable of reading the card when it is placed in a determined position in relation to the reader. The card includes a first memory (RAM) and a second nonvolatile erasable and re-writable memory (EEPROM), the latter having locations containing data records relative to the transactions performed by the card, each transaction resulting in the modification of at least one of the data locations and the addition of a new record.

This method according to the invention includes the following steps:

a) for a data record to be modified or a record to be added, reading the address of a free location of the second memory in a previous check register located in a first determined location of the second memory, b) writing the new modified or added record in the free location, c) repeating steps a) and b) for each of the new records to be modified or added, d) writing, in a second determined location of the second memory, a new check register containing the addresses of the free locations of the second memory to be used in the next transaction.

BRIEF DESCRIPTION OF THE DRAWINGS

The purposes, objects and characteristics of the invention will become more apparent from the following description when taken in conjunction with the only FIGURE representing a flowchart of the process according to the invention.

DETAILED DESCRIPTION OF THE INVENTION

In the following description, it is assumed that the smart card used for the transaction features an EEPROM memory divided into identical sectors of 32 bytes, for example. An essential characteristic of the invention is the use of a check register that occupies one of the sectors of the memory. This check register contains data, intended to be used for making a transaction, among which the identification of the memory's free sectors may be used for recording new data. The check register particularly includes the following fields:

FlagOpen: indicates if a transaction is open or not,
OldSect: indicates the numbers of the sectors prior to their modification,
PrevReg: indicates the sector number where the previous check register was located.
NextReg: indicates the sector number where the previous check register was located.
FlagClose: indicates whether or not a transaction is closed, NewSect: indicates the numbers of free sectors for new modifications, By assuming that a transaction is carried out, the process according to the invention takes place according to the flowchart illustrated in the single figure. There is initially an initialization step (step 10), which consists in initializing 4 variables in the card's RAM memory:

Check register address: number of the sector in which the check register is located, NbUpdates: variable incremented after each record modification or addition of a new record.

TransactionLevel: bit indicating that the transaction is in progress,

OldSector: indicates the sector numbers where data are recorded throughout the transaction.

The second step is the transaction opening step (step 12) during which the TransactionLevel bit of the RAM memory changes from 0 to 1 and the Flagopen field of the check register which was 0 is set to the hexadecimal value A5.

In the next step, it is determined if there is a record to be modified or added in a memory location (step 14). If this is the case, the number of the old sector is written in RAM memory (step 16), the address of the sector in which the new record must be written is read in the check register (step 17), the new record is written in a sector identified by a number read in the check register (step 18), and the modifications of the check data in the RAM memory are carried out (step 20). The process loops back to determine if another record is to be modified or added (step 14).

It should be noted that the advantage of the invention mainly resides in the fact that the transaction almost always necessitates modification of several records, which permits the use of the check register without losing time since free sectors are indicated in the check register without the need to search for them.

It should be noted that, in the case of a record addition and not a record modification, a sector number in the RAM is not memorized as this sector does not exist, but a virtual number 0 is memorized instead.

| Sector | Contents |
|---|---|
| 1 | record #1 |
| 2 | record #2 |
| 3 | record #3 |
| 4 | record #4 |
| 5 | check register |
| 6 | free, new check register |
| 7 | free, modification candidate #1 |
| 8 | free, modification candidate #2 |
| 9 | free, modification candidate #3 |
| 10 | free, modification candidate #4 |
| 11 | free, modification candidate #5 |
| 12 | free, modification candidate #6 |
| 13 | free, modification candidate #7 |
| 14 | free, modification candidate #8 |

When there are no more records to write in memory, a new check register containing new data is written in a free sector whose number is provided by the old check register (step 18), the old check register is erased (step 20), the old sectors containing records which resulted in a modification are erased (step 22) and the RAM check variables are reset to zero (step 24).

In order to illustrate the process of the invention, the following example can be considered in which the EEPROM memory takes the following form prior to the transaction:

The check register located in sector 5 includes the data below:

| | |
|---|---|
| FlagOpen: | 00 |
| OldSect: | 0, 0, 0, 0, 0, 0, 0, 0, 0 |
| PrevReg: | 0 |
| NextReg: | 6 |
| FlagClose: | A5 |
| NewSect: | 7, 8, 9, 10, 11, 12, 13, 14 |

Assuming that the transaction consists of four consecutive changes:

| |
|---|
| modification of record 2 |
| modification of record 3 |
| addition of record 5 |
| second modification of record 2 |

Following the initialization step, the process steps are as follows:

Opening of the transaction: write the FlagOpen field at A5 in hexadecimal in the current register and initialization of the variables:

➤NbUpdates=0

➤TransactionLevel=1

➤OldSect[8]={0, 0, 0, 0, , 0, 0, 0, 0}

Modification of record #2: memorize the old sector #2 in RAM, write the new record in sector #7; the RAM variables are:

➤NbUpdates=1

➤TransactionLevel=1

➤OldSect [8]={2, 0, 0, 0, 0, 0, 0, 0, 0}

Modification of record #3: memorize the old sector #3 in RAM, write the new record in sector #8. The RAM variables are:

➤NbUpdates=2

➤TransactionLevel=1

➤OldSect[8]={2, 3, 0, 0, 0, 0, 0, 0, 0}

Addition of record #5: memorize the old sector #0 in RAM (0 signifies the old absent sector), write the new record in sector #9. The RAM variables are:

➤NbUpdates=3

➤TransactionLevel=1

➤OldSect[8]={2, 3, 0, 0, 0, 0, 0, 0, 0}

Modification of record #2: memorize the old sector #7 in RAM, write the new record in sector #10. The RAM variables are:

➤NbUpdates=4

➤TransactionLevel=1

➤OldSect[8]={2, 3, 0, 7, 0, 0, 0, 0, 0}

Transaction closure:

➤decrement TransactionLevel

➤write the new register in sector #6 with FlagClose=0

➤erase the old check register

➤erase the old sectors #2, #3, #7

➤write FlagClose at $A5

➤initialize:

NbUpdates=0

TransactionLevel=0

OldSect[8]={x, x, x, x, x, x, x, x, x}

After the transaction, the EEPROM memory takes the following form:

The new check register contains the following data:

| FlagOpen: | 00 |
| OldSect: | 2, 3, 0, 7, 0, 0, 0, 0 |
| PrevReg: | 5 |
| NextReg: | 11 |

| Sector | Contents after transaction |
|---|---|
| 1 | record #1 |
| 2 | free |
| 3 | free |
| 4 | record #4 |
| 5 | free, old check register |
| 6 | check register |
| 7 | free |
| 8 | record #3 |
| 9 | record #5 |
| 10 | record #2 |
| 11 | free, new check register |
| 12 | free, modification candidate #1 |
| 13 | free, modification candidate #2 |
| 14 | free, modification candidate #3 |
| 15 | free, modification candidate #4 |
| 16 | free, modification candidate #5 |
| 17 | free, modification candidate #6 |
| FlagClose: | A5 |
| NewSect: | 12, 13, 14, 15, 16, 17 |

We see that the new check register contains the identification of the old sectors whose values were supplied by the RAM, the identification of the sector where the old check register was located, the identification of the sector where the next check register is to be placed, the numbers of the free sectors where the next modifications are to be written, and the indication (FlagClose) that the transaction was closed.

If a power failure occurs while modifications are being made to the EEPROM memory, the contents of the RAM is lost, although the condition of the data allows any transaction to be repeated again from zero without fear of losing sensitive data. All the sectors which were likely to have been written simply have to be erased using new data, either by erasing all sectors labeled as "free" in the check register, or by erasing only those which were written after having scanned their contents to check if they were written (otherwise, they contain zeros).

It should be noted that if the power failure occurs during transaction closure, having placed a 0 in the FlagClose field of the new check register indicates that the transaction is not closed and that the contents of the old sectors which were erased at the penultimate operation must be taken into account, the last operation being the writing of FlagClose indicating the closure of the transaction.

The process according to the invention uses fewer cycles in comparison with the process which saves data in a buffer memory. In the traditional process, 4 EEPROM memory operations are required for each data modification: writing in the buffer memory zone, erasing the future location, writing the new data in this location and erasing the location in the buffer memory zone. On top of that, one must also add Buffer memory management and the management of information relative to the data to be stored.

In contrast, the procedure according to the invention requires only 2 EEPROM operations for each modification, namely the writing of new data in a new sector and the erasure of the old sector, as well as 4 general operations, namely writing of FlagOpen in the check register at the start, the erasure of the old check register, the writing of the new check register and the writing of FlagClose in the check register.

In this manner, for N modifications, the following comparison table can be established giving the number of EEPROM memory operations in the traditional process and in the process according to the invention, as well as the savings made.

| | Number of flash memory (EEPROM) operations | | |
|---|---|---|---|
| N | Traditional 4N + 2 | Invention 2N + 4 | Savings |
| 1 | 6 | 6 | 0 |
| 2 | 10 | 8 | 2 |
| 3 | 14 | 10 | 4 |
| 4 | 18 | 12 | 6 |
| 5 | 22 | 14 | 8 |

If a write or erase operation in the EEPROM memory lasts 5 ms, the savings made with a minimum of 4 operations is 30 ms.

Beside to the gain of time, one should add the gain of time which is the result of the fact that it is not necessary to scan the EEPROM memory for finding 4 free sectors because of the fact that free sectors are indicated in the check register.

The invention claimed is:

1. A process for modifying data in a card-based transaction system featuring a memory card and a reader capable of reading said card when the latter is located in a position determined in relation to the reader, said card featuring a first RAM memory and a second nonvolatile erasable and rewritable memory, the latter including locations containing data records related to the transactions made by said card, each transaction leading to the modification of at least one of said data locations or the addition of a new record, said process comprising the following steps:
   a. for a data record to be modified or a record to be added, reading the address of a free location of said second memory in a previous check register located in a first determined location of said second memory,
   b. writing the new modified or added record in said free location,
   c. repeating steps a) and b) for each of the records to be modified or added,
   d. writing, in a second determined location of said second memory, a new check register containing the addresses of the free locations of said second memory to be used in the next transaction, wherein the address of the second determined location is given by said previous check register, and
   e. erasing said previous check register in said first determined location of said second memory when the transaction is closed and indicating in said new check register that said first determined location is free.

2. The process according to claim 1, also including the following step carried out prior to step a),
   writing the number of the location where the record to be modified or added is placed in said first RAM.

3. The process according to claim 2, in which said location number written in said first RAM is a virtual number when the operation to be performed concerns a record to be added.

4. The process according to claim 2, in which two variables are recorded in memory when the transaction is initialized, a first variable (NbUpdates) being set to zero so that it can be incremented at each record modification or addition operation and a second variable (TransactionLevel) being set to zero so that it can be changed from 0 to 1 when the transaction is in progress.

5. The process according to claim 4, in which said variables of said first RAM are reset to zero when the transaction is closed.

6. The process according to claim 5 in which a field (FlagClose) of said new check register is reset to zero before said previous check register and said records, which were modified or added, are erased and set to another value after these operations have been performed.

7. The process according to claim 2, in which the numbers of said locations containing the records which were modified or added are written in said new check register from said first RAM when the transaction is closed.

8. The process according to claim 1, in which the locations containing the records that were modified are erased when the transaction is closed.

9. A system including means to implement the steps of the process according to claim 1.

* * * * *